UNITED STATES PATENT OFFICE.

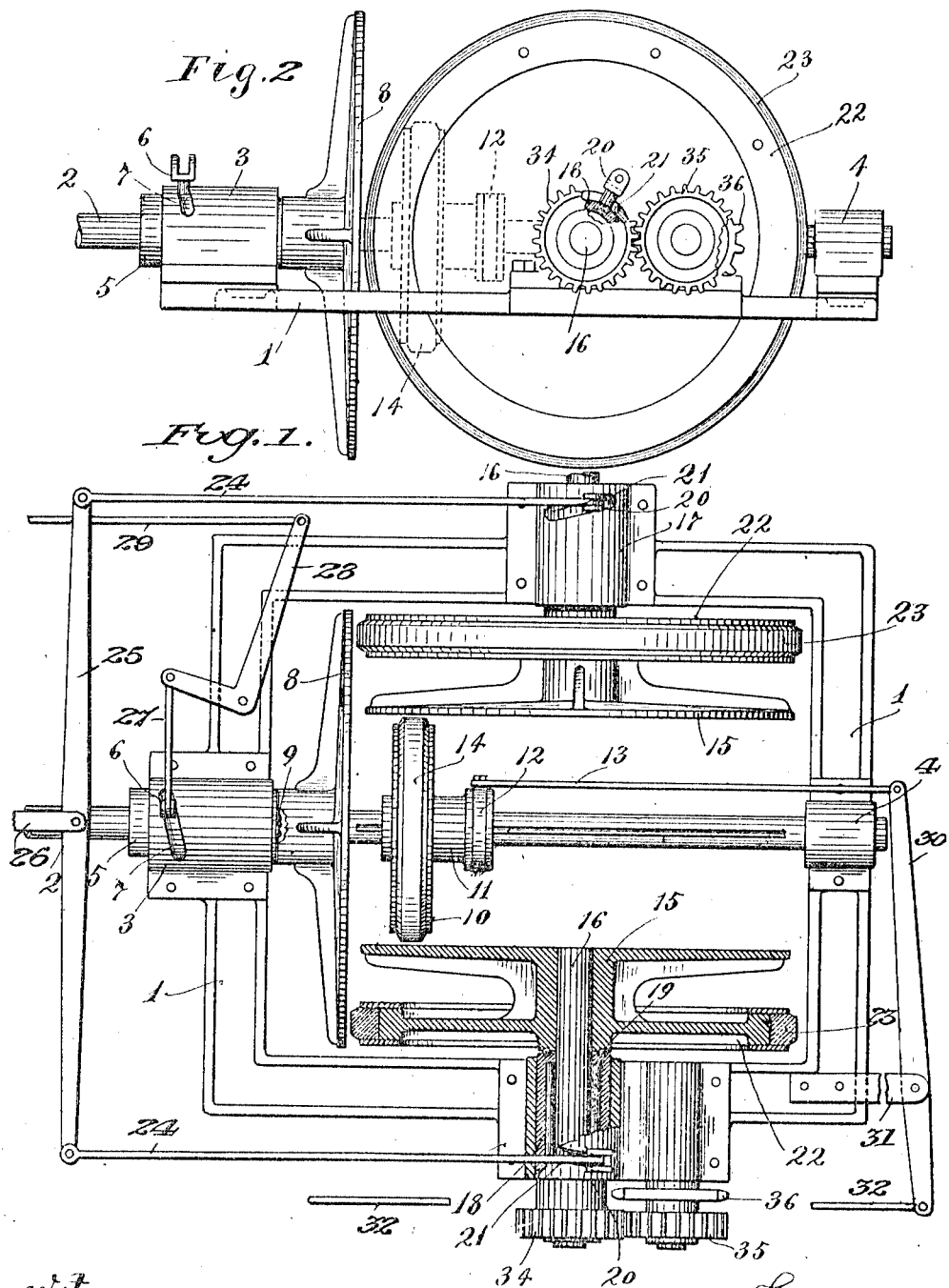

BIRGE W. DAVENPORT, OF MINNEAPOLIS, MINNESOTA, ASSIGNOR TO DISPATCH MOTOR CAR COMPANY, OF MINNEAPOLIS, MINNESOTA, A CORPORATION OF SOUTH DAKOTA.

FRICTIONAL TRANSMISSION MECHANISM.

1,066,472.        Specification of Letters Patent.        Patented July 8, 1913.

Application filed November 29, 1911. Serial No. 663,113.

*To all whom it may concern:*

Be it known that I, BIRGE W. DAVENPORT, a citizen of the United States, residing at Minneapolis, in the county of Hennepin and State of Minnesota, have invented certain new and useful Improvements in Frictional Transmission Mechanism; and I do hereby declare the following to be a full, clear, and exact description of the invention, such as will enable others skilled in the art to which it appertains to make and use the same.

My invention has for its object to provide an extremely simple and highly efficient reversible variable speed frictional transmission mechanism, especially adapted for use on automobiles or motor propelled vehicles, and to such ends, generally stated, the invention consists of the novel devices and combinations of devices hereinafter described and defined in the claims.

In the accompanying drawings which illustrate the invention, like characters indicate like parts throughout the several views.

Referring to the drawings, Figure 1 is a plan view, showing the transmission mechanism, some parts being broken away and some parts in horizontal section; and Fig. 2 is a side elevation of the parts shown in Fig. 1, some parts being broken away.

The various running parts of the frictional transmission mechanism are journaled on a metal frame 1, which, as shown, is rectangular, and which is adapted to be rigidly or suitably secured to the framework of the automobile or motor propelled vehicle.

The numeral 2 indicates the engine crank shaft or a shaft driven from the engine crank shaft, and which, for the purposes of this case, is treated as the driving shaft. This shaft will extend longitudinally of the machine and is journaled in suitable bearings 3 and 4, on the frame 1. The driving shaft 2 is not directly journaled in the bearing 3, but is directly journaled in a bearing sleeve 5 mounted in the said bearing 3 with freedom for slight endwise and slight rotary movements. This sleeve 5 is provided with a projecting arm 6 that works in an oblique cam slot 7 formed in the top of the bearing 3, so that by oscillatory movements of the said arm 6, said sleeve 5 may be given a slight endwise movement, thereby adapting the same to act as a thrust member for an important purpose which will presently appear.

Secured to the driving shaft 2, just at the rear of the thrust sleeve 5 is a flat faced friction wheel or disk 8, the hub of which is subject to the crowding force of the rear end of said sleeve Preferably, anti-friction devices, such as ball bearings 9, are interposed between the hub of the friction wheel 8, and the adjacent end of the thrust sleeve 5.

Keyed for rotation with the driving shaft 2, but mounted for sliding movements thereon, is a friction wheel 10, the hub 11 of which has a groove in which works a non-rotary shipper ring 12, that is connected to one end of an operating link 13. The flat face of the friction wheel 8 affords a frictional working surface therefor, but the peripheral face of the wheel 10 affords the frictional working surface of the latter. To afford the proper peripheral frictional face to the wheel 10, it is provided with a rigidly secured inset peripheral friction ring 14, constructed of wood fiber or similar hard, tough, non-metallic material. The friction wheel 10 is interposed between and coöperates with the flat frictional faces of a pair of friction wheels or disks 15 secured to the inner ends of a pair of axially alined driven shafts 16 journaled in suitable bearings 17, secured on the sides of the frame 1. These so-called driven shafts 16 are not directly journaled in the said bearings 17 but are directly journaled in thrust sleeves 18, which, in turn, are mounted in the said bearings 17 with freedom for slight endwise and slight rotary movements. Ball bearings 19 are preferably interposed between the hubs of the friction wheels 15 and the inner ends of the thrust sleeves 18, and the said thrust sleeves are provided with upwardly projecting arms 20 that work in oblique cam slots 21 formed in the tops of said bearings 17.

Secured to each shaft 16, as shown, directly to the hub of each friction disk 15, are friction wheels 22 provided in their peripheries with inset rigidly secured friction rings 23, of wood fiber or similar hard and tough non-metallic material. These friction rings 23 are adapted to run against the face of the friction wheel 8 to engage the same at diametrically opposite points and secured to the axis of the driving shaft 2.

The cam slots 21, in the tops of the bearings 17, it will be noted, are inclined in reverse directions, so that by simultaneous movements of the arms 20 toward the right, in respect to Fig. 2, the faces of the friction wheels or disks 15 may be simultaneously engaged with the friction ring 12 of the friction wheel 10, at diametrically opposite points. For producing these simultaneous movements of the said arms 20, they are shown as connected by links 24 to an equalizing bar 25 which, in turn, is intermediately pivoted to an operating bar 26, which, in practice, may be connected to a lever or other suitable actuating device. The arm 6 of the thrust hub 5 is shown as connected by a short link 27 to a bell crank 28 pivoted on the frame 1 and adapted to be operated by a rod 29 which, in turn, may be actuated by a suitable lever or other device.

The link 13, which, as already noted, is connected to the shipper ring 12 for moving the friction wheel 10 toward and from the alined axes of the shafts 16, is shown as connected to a lever 30, which, in turn, is shown as intermediately pivoted to a projection 31 of the frame 1 and is connected to one end of an operating rod 32, which, in turn, is adapted to be operated by a suitable lever or other device.

At one end, one of the shafts 16 is shown as provided at its outer end with a sprocket 33, and the other shaft 16 at its outer end is shown as provided with a spur gear 34 that meshes with a like spur gear 35 suitably journaled to the adjacent bearing 17 and provided with a sprocket 36. These sprockets 33 and 36 are adapted to drive sprocket chains which, in turn, will run over sprockets, not shown, on the rear axle of the automobile or motor propelled vehicle.

For the sake of brevity, the friction wheels which have peripheral frictional surfaces may be designated as peripheral friction wheels and those that have frictional surfaces on their faces or sides may be designated as face friction wheels. The above terms will be hereinafter employed to designate the said two kinds of friction wheels.

Operation: The frictional transmission mechanism described is capable of use in quite a number of different ways, but the usual manner of using the same will be substantially as follows:—The transmission mechanism will be thrown into action by pressing the face friction wheel 8 against the friction rings 23 of the peripheral friction wheels 22. This will simultaneously drive the two shafts 16 at the same speed but in opposite directions, but the two sprockets 33 and 36 will, nevertheless, be driven in the same direction and at the same speed because the motion of one shaft 16 is reversed by the gear 35. In thus starting, there will be sufficient slippage between the friction wheels 8 and 22 to prevent shocks, and this is especially so if the pressure be gradually applied to the said wheel 8. When this frictional connection is made between the said wheels, the frictional driving force will be divided between the two wheels 22 and the pressure on the face friction wheel 8 will be equalized on opposite sides of the axis thereof, and hence, there will be no tendency to bend the driving shaft, or to cramp the same in its bearing, but on the contrary, the pressure required to maintain the frictional engagement will be taken directly in line with the axis of the said driving shaft. These features are highly important. In starting under heavy load or up hill grade, it is advisable to move the sliding peripheral friction wheel 10 forward close to the rim of the face friction wheels 15. When the said face friction wheels 15 are then simultaneously pressed against the friction ring 14 of the said wheel 10, the shafts 16 will be simultaneously driven at the same speed, in reverse directions and at a speed which is considerably slower than that which is produced by engagement of the wheel 8 with the wheels 22. This gives slow speed and greater power in starting. When the machine is thus started, the speed may be increased by moving the wheel 10 on the driving shaft 2 toward the axis of the shaft 16. When the friction wheel 10 is set about midway between the axis of the periphery of the friction wheels 15, the driving speed, will be approximately the same as when the friction wheel 8 is engaged with the friction wheels 22, and hence, the shift from the one set of friction wheels to the other, may be made without change of speed at such times. When a very high speed is desired, as for racing purposes, the friction wheel 10 will be set quite close to the axes of the shafts 16. When the machine is to be reversed or driven backward and friction wheel 10 is moved to the opposite or rear side of the axis of the shaft 16, the wheels 15 are then engaged with the said wheel 10. This affords a reversible friction drive that is variable in speed both for driving the machine forward and backward. For ordinary road speeds, the best results are obtained by the use of the friction wheels 8 and 22, but for the variable transmission of the driving power, the adjustable wheel 10, in coöperation with the wheels 15, are required. It is, of course, important that the variable speed frictional transmission gears be arranged to drive at both higher and lower speeds than the constant speed transmission gears, to-wit, the gears 8 and 22. This moves the greater range of driving actions and permits the driving force to be shifted from the one to the other set of frictional driving gears without change of speed and without shock.

As already stated, sprocket chains, not shown, will run over the sprockets 33 and 36 and over sprockets of the rear wheels.

The above described frictional transmission mechanism provides for all the various different speeds and other action required for the transmission mechanism of an automobile or motor propelled vehicle. It is adapted for use in connection with a steam engine, an explosive engine, and an electric motor. When this frictional transmission mechanism is employed, it performs all of the functions of a variable speed transmission mechanism, of a reversing device, clutch mechanism, and of a differential or compensating gear, and its use therefore not only very greatly lightens the machine but very greatly reduces the cost thereof. The efficiency of the transmission mechanism has been thoroughly demonstrated in practice.

What I claim is:

1. In a frictional transmission mechanism, the combination with driving and driven shafts, of a face friction wheel and a peripheral friction wheel carried by said driving shaft, a pair of driven shafts, peripheral friction wheels on said driven shafts for coöperating with the face frictional wheel on said driving shaft, face friction wheels on said driven shafts for coöperation with the peripheral friction wheel on said driving shaft, and means for rendering either of the friction wheels on said driving shaft operative, at will.

2. In a frictional transmission mechanism, the combination with driving and driven shafts, of a face friction wheel and a peripheral friction wheel carried by said driving shaft, said latter wheel being slidably adjustable thereon, a pair of driven shafts, peripheral friction wheels on said driven shafts for coöperation with the face friction wheel on said driving shaft, face friction wheels on said driven shafts for coöperation with the said slidably movable friction wheel of said driving shaft, and means for slidably moving said adjustable friction wheel toward and from the axis of said driven shafts and for engaging either of the two sets of friction wheels, at will.

3. In a frictional transmission mechanism, the combination with driving and driven shafts, of a face friction wheel and a peripheral friction wheel carried by said driving shaft, said latter wheel being slidably adjustable thereon, a pair of driven shafts, peripheral friction wheels on said driven shafts for coöperation with the face friction wheel on said driving shaft, face friction wheels on said driven shafts for coöperation with the said slidably movable friction wheel of said driving shaft, means for slidably moving said adjustable friction wheel toward and from the axis of said driven shafts, means for engaging either of the two sets of friction wheels, at will, a sprocket carried by one of said driven shafts, a gear carried on the other driven shaft, a second gear meshing with the first noted gear, and a sprocket carried by said second gear, the said two sprockets being driven in the same direction.

4. In a frictional transmission mechanism, the combination with driving and driven shafts, of a face friction wheel and a peripheral friction wheel carried by said driving shaft, said latter wheel being slidably adjustable thereon, a pair of driven shafts, peripheral friction wheels on said driven shafts for coöperation with the face friction wheel on said driving shaft, face friction wheels on said driven shafts for coöperation with the said slidably movable friction wheel of said driving shaft, means for slidably moving said adjustable friction wheel toward and from the axis of said driven shafts, means for engaging either of the two sets of friction wheels, at will, endwise movable thrust bearings in which said driving and driven shafts are journaled, and connections for moving the said thrust bearings endwise to throw either of the two sets of friction wheels into action, at will.

In testimony whereof I affix my signature in presence of two witnesses.

BIRGE W. DAVENPORT.

Witnesses:
BENNIE G. WHEELER,
HARRY D. KILGORE.